Figure 1:
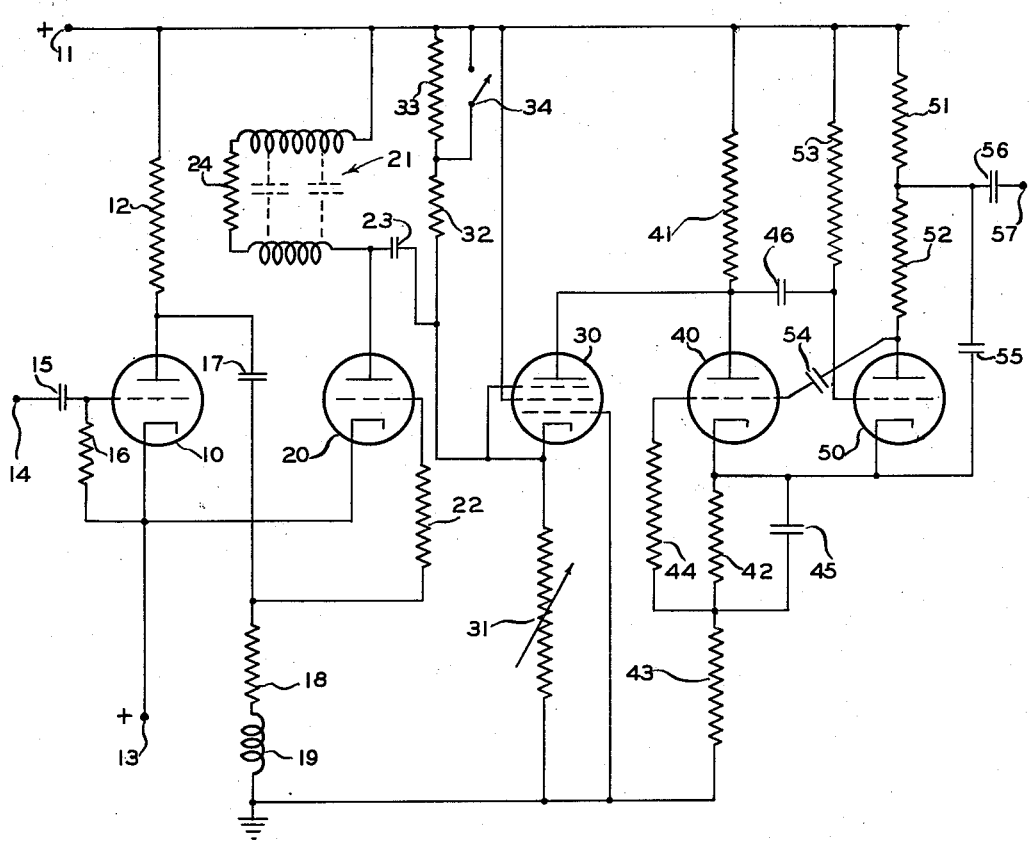

Dec. 25, 1951     L. BESS     2,580,213
PULSE DISCRIMINATION CIRCUIT RESPONSIVE
TO DOUBLE SETS OF PULSES
Filed April 18, 1945

INVENTOR.
LEON BESS
BY
ATTORNEY

Patented Dec. 25, 1951

2,580,213

UNITED STATES PATENT OFFICE 2,580,213

PULSE DISCRIMINATION CIRCUIT RESPONSIVE TO DOUBLE SETS OF PULSES

Leon Bess, Boston, Mass., assignor, by mesne assignments, to the United States of America as represented by the Secretary of War Application April 18, 1945, Serial No. 588,993

3 Claims. (Cl. 250—27)

My invention relates in general to control circuits and more particularly to circuits responsive only to sets of control pulses of predetermined characteristics.

Radiant energy identification systems have been developed comprising interrogator-responsor units, containing transmitting and receiving components, which transmit interrogating radiant energy pulses to remote transponder units that also contain receiving and transmitting components and are responsive to the interrogating radiant energy pulses. This response is of the nature of identifying radiant energy signals which are transmitted back to and received by the interrogator-responsor units to provide the necessary identification.

It has been found advantageous to use transponders which are responsive only to a predetermined type of transmission so that identification signals will be transmitted only in reply to interrogator-responsors with the proper interrogating transmission. Accordingly, it is one of the objects of my invention to provide a circuit which can be incorporated in a transponder to make it responsive only to sets of radiant energy pulses of predetermined characteristics.

It is also among the objects of my invention to provide a control circuit which is able to discriminate between control pulses separated by a predetermined time interval and those of differing time separations.

In general, my invention embodies a circuit which is responsive to a succession of two electrical pulses spaced apart by a predetermined time interval. The response is of the nature of a control signal which can be used as a trigger or keying voltage to actuate associated electrical apparatus.

In the application of this circuit referred to above, the receiving component of the transponder, which may be, for instance, a super-regenerative receiver, receives, detects, and amplifies the radiant energy pulses transmitted by the interrogator-responsor system and supplies these pulses in video forms to the circuit herein disclosed, hereinafter referred to as a double pulse decoding circuit. The double pulse decoding circuit is responsive to the video pulses, provided they are separated by the proper time interval, and generates a control signal which actuates or keys the transmitting component of the transponder so that identifying signals are transmitted to the interrogator-responsor. Such an identification system embodying a double pulse decoding circuit is more fully disclosed in my copending application entitled "Electrical Apparatus" filed April 18, 1945, Serial No. 588,994.

My invention will best be understood by reference to the appended drawing, in which:

Fig. 1 is a specific circuit diagram of a double pulse decoding circuit.

The circuit shown in Fig. 1 includes a number of thermionic vacuum tubes; tubes 10, 20, 40, and 50 are triodes having anode, cathode, and control electrodes; tube 30 is a pentode having anode, cathode, control, screen, and suppressor electrodes. A source of positive D.-C. plate voltage is provided at terminal 11 and a source of D.-C. voltage of much less magnitude is applied at terminal 13 to be used as a positive cathode bias voltage. Terminal 14 is an input terminal for the application of control pulses.

The plate of tube 10 is connected through a plate load resistor 12 to the plate voltage supply at 11, and its cathode is connected to the biasing source at terminal 13. The control grid is connected through coupling capacitor 15 to the input terminal 14, and it is connected to the cathode through a grid leak resistor 16. Connected between the plate of tube 10 and ground is a differentiating or peaking circuit comprising a capacitor 17, a resistor 18, and an inductance coil 19 which are series connected between plate and ground in the order as recited. This peaking circuit operates in a conventional manner to produce sharp spikes or voltage pulses when sudden changes in applied voltage occur as in the case of a rectangular voltage waveform.

The plate of tube 20 is connected to the plate voltage supply 11 through a delay line 21. In this case, the delay line is a long coil wound in such a manner that it possesses considerable distributed capacitance so that its equivalent circuit is similar to that of delay lines will known in the art. The winding is made in two sections joined by a small attenuating resistance 24 with an impedance considerably less than the characteristic impedance of the line so that a short circuit termination of the line is approximated. The cathode of tube 20 is connected directly to the cathode of tube 10 and thereby is provided with the bias voltage from 13. The grid of tube 20 is connected through resistor 22 to the junction between capacitor 17 and resistor 18 in the peaking circuit.

The plate of tube 30 is connected to the plate of tube 40, and its cathode is connected to ground through variable resistor 31. The suppressor grid is connected to the cathode, the screen grid is connected to plate supply source at terminal 11, and the control grid is connected to ground The cathode is connected to the plate of tube 20 through capacitor 23 and to the source of plate voltage 11 through the series combination of resistors 32 and 33. Resistor 33 is shunted by a single pole, single throw switch 34 which is normally closed.

Tubes 40 and 50 with their associated circuit elements comprise a multivibrator circuit. The plate of tube 40 is connected to the plate voltage source 11 through resistor 41, and the cathode is connected to ground through the series combination of resistors 42 and 43. Resistor 42 is shunted by capacitor 45 to provide a substantially constant cathode bias. The grid of tube 40 is connected to the junction between resistors 42 and 43 through resistor 44, and to the plate of tube 50 through capacitor 54.

The plate of tube 50 is connected to the plate voltage source 11 through the series combination of resistors 51 and 52. The grid of tube 50 is connected to the source 11 through resistor 53 and to the plate of tube 40 through capacitor 46. The cathode of tube 50 is connected to the cathode of tube 40. A capacitor 55 is connected from the junction of resistors 51 and 52 to the cathode of tube 50. The output is taken from terminal 57 which is connected to the junction of resistors 51 and 52 through coupling capacitor 56.

In the operation of the circuit, with switch 34 closed it is necessary to apply to terminal 14 a set of two negative control pulses which have corresponding points on their waveforms separated by a time increment equal to four times the delay time $\delta$ which is the time that it takes a pulse to travel the length of the delay line 21. As the first pulse is applied to the grid of tube 10, an amplified and inverted, or positive, pulse appears at the plate. The positive pulse is applied to the peaking or differentiating circuit comprising capacitor 17, resistor 18, and coil 19 so that by its conventional differentiating action, a sharp positive voltage spike is produced at the time that the leading edge of the pulse is applied.

Tube 20 is normally cut off by the biasing action of the positive voltage which is applied to its cathode, but when the positive voltage spike from the peaking circuit is applied to its grid, the tube conducts for the duration of the spike, and a negative pulse is initiated at its plate. This pulse travels down the delay line which has a negative reflection coefficient at the far end due to the approximate short circuit termination. The pulse is then reflected back with opposite polarity to the input terminals of the delay line. Since tube 20 is again cut off after the termination of the spike on the grid, a high impedance and therefore a positive reflection coefficient is presented to the pulse as it returns after a total elapsed time of $2\delta$ so that the pulse is again reflected but without change in polarity. The pulse again travels back to the low impedance end of the delay line, is reflected once more with a reversal of polarity, and arrives back again at the input terminals after a total elapsed time of $4\delta$ with its original polarity.

Tube 30 is normally cut off due to the positive potential applied to its cathode by the voltage dividing action of resistors 31, 32, and 33. This potential is adjusted by variable resistor 31 so that the magnitude of the first negative voltage pulse applied from the plate of tube 20 is not great enough to drop the cathode down to a potential permitting conduction. However, after a time $4\delta$ from the application of the first control pulse to terminal 14, the second pulse of the set is applied. This second pulse is also amplified, inverted, and peaked as was the first pulse so that when it is applied to the grid of tube 20 after the time $4\delta$, it causes a negative pulse at the plate of tube 20 that adds to the reflected first pulse, which is also present at that time. The resultant negative pulse is of a magnitude large enough to force the cathode of tube 30 down to a potential which permits that tube to conduct for the duration of the pulse, and therefore a negative pulse appears at the plate of tube 30. The magnitude of the reflected delay line pulses is attenuated to a certain degree by the attenuating resistor 24 so that difficulty with undesired reflections after the time $4\delta$ is eliminated.

The negative pulse from tube 30 is applied to the multivibrator circuit in such a manner that tube 50, which is normally conducting, is cut off, and tube 40 starts conducting. This initiates a positive voltage wave at the cathodes of tubes 40 and 50 and at the plate of tube 50 since the circuit elements are so chosen that tube 40 conducts more heavily than did tube 50. The duration of the positive voltage wave at the cathodes, or the relative conduction time of each tube, is determined by the associated circuit elements as in the conventional operation of triggered multivibrators well known in the art. In this particular multivibrator, because of the rising of the cathode voltage, capacitor 55 provides a "boot strapping" action by applying the positive voltage wave developed at the cathode of tube 50 to the plate of tube 50 to further increase the magnitude of the positive voltage wave developed there. Thus a large magnitude positive voltage wave is developed on tube 50, although this tube draws only a small plate current in its normal conducting condition. This positive voltage wave is applied to terminal 57 as the output control voltage which may be used as a keying voltage as suggested in the application referred to previously.

As a very brief summary of the action of this circuit, if two control pulses separated by the proper time interval are applied, a pulse is developed at the plate of tube 30 which triggers a multivibrator to produce an output control voltage.

With switch 34 closed, the circuit will not be responsive to one long pulse since no second pulse will be applied to the delay circuit from the peaker circuit after the time $4\delta$. However, with switch 34 open, tube 30 is rebiased so that a single pulse applied to the input of the circuit will develop a voltage at the plate of tube 20 large enough to cause tube 30 to conduct. Thus an output control pulse can be developed, if so desired, with a single pulse input.

It will be apparent to those skilled in the art that changes and modifications can be made in the specific circuit herein disclosed without departing from the spirit and scope of my invention, and therefore I claim all such modifications and changes as fall fairly within the spirit and scope of the hereinafter appended claims.

What I claim is:

1. A circuit for generating a control signal upon receiving two pulses separated by a predetermined time interval comprising a differentiating network, means to impress the received pulses upon said network, a vacuum tube having at least a cathode, anode and control grid electrodes, means for impressing the output of said differentiating network on said control grid, a time delay network having a given characteristic impedance and both an input and a remote end, said input end being connected to said anode, said network being terminated at its input end by an impedance appreciably greater than said characteristic impedance and at its remote end by an impedance appreciably smaller than said characteristic impedance, said delay network having a delay interval from its input end to its remote end of one-quarter of said predetermined time interval, whereby the first of said two pulses impressed upon said differentiating network appears as a first differentiated pulse in said anode circuit and is twice reflected back from the remote end of said time delay network to said input end, whereupon said reflected pulse will be of the same polarity as, and coincident in time with, a second differentiated pulse resulting from the application of the second of said two pulses to said differentiating network and means connected to said input end of said time delay network for deriving a control signal from said coincident reflected and second differentiated pulses.

2. A circuit for deriving a control signal from two pulse signals having a predetermined time interval therebetween comprising an electrical delay network having input terminals and terminals remote from said input terminals, a source connected to said input terminals for transmitting pulse signals to said delay network, said network being terminated at said input terminals by a substantially open circuit and at said remote terminals by a substantially short-circuit, said pulse signals being thereby reflected from both the input and remote terminals of said delay network, an electronic device, means connecting said device, to said input terminals for receiving both the reflected and unreflected transmitted pulses, means for biasing said device to a value such that it is rendered conductive only when a reflected pulse at said input terminals is of the same polarity as, and is coincident in time with, an unreflected transmitted pulse at said input terminals, and means connected to the output of said device for deriving therefrom a control signal.

3. A circuit for deriving a control signal from two pulse signals having a predetermined time interval therebetween comprising an electrical delay network having input terminals and remote terminals, a source connected to said input terminals for impressing pulse signals on said delay network, said network having an impedance mismatch at both said input and remote terminals so that said pulse signals are reflected from both said input and said remote terminals, an electronic device, means connecting said device to a given point on said network for receiving both the reflected and the impressed pulses, means for biasing said device to a value such that it is rendered conductive only when a reflected pulse at said point on said network is of the same polarity as, and is coincident in time with, an unreflected impressed pulse at said point on said network, and means for deriving a control signal from the output of said device.

LEON BESS.

REFERENCES CITED

The following references are of record in the file of this patent:

UNITED STATES PATENTS

| Number | Name | Date |
|---|---|---|
| 2,061,734 | Kell | Nov. 24, 1936 |
| 2,188,970 | Wilson | Feb. 6, 1940 |
| 2,211,942 | White | Aug. 20, 1940 |
| 2,217,957 | Lewis | Oct. 15, 1940 |
| 2,252,599 | Lewis | Aug. 12, 1941 |
| 2,266,154 | Blumlein | Dec. 16, 1941 |
| 2,416,424 | Wilson | Feb. 25, 1947 |

FOREIGN PATENTS

| Number | Country | Date |
|---|---|---|
| 528,192 | Great Britain | Oct. 24, 1940 |